United States Patent [19]

Lee

[11] Patent Number: 5,588,726
[45] Date of Patent: Dec. 31, 1996

[54] CABINET WALL BOARD ASSEMBLY

[76] Inventor: Shang-Ming Lee, 5F-1, No. 3, Lane 179, Yen-Ping S. Rd., Taipei, Taiwan

[21] Appl. No.: 547,203

[22] Filed: Oct. 24, 1995

[51] Int. Cl.⁶ .................................................. A47B 47/00
[52] U.S. Cl. ........................ 312/263; 403/381; 403/231; 403/295; 312/265.5
[58] Field of Search .................... 403/381, 231, 403/403, 205, 295, 401; 312/263, 265.5, 257.1, 195, 348.2, 111; 217/65

[56] References Cited

U.S. PATENT DOCUMENTS

| | | | |
|---|---|---|---|
| 3,977,742 | 8/1976 | Rovere | 312/263 X |
| 4,025,215 | 5/1977 | Murdock et al. | 403/381 |
| 4,683,634 | 8/1987 | Cole | 403/295 X |
| 5,114,265 | 5/1992 | Grisley | 403/403 X |

FOREIGN PATENT DOCUMENTS

| | | | |
|---|---|---|---|
| 1204682 | 8/1959 | France | 403/231 |
| 2541737 | 8/1984 | France | 403/231 |

*Primary Examiner*—Peter M. Cuomo
*Assistant Examiner*—Janet M. Wilkens
*Attorney, Agent, or Firm*—Varndell Legal Group

[57] ABSTRACT

A cabinet wall board assembly including a horizontal board, a wall board and multiple adjoining members. The horizontal board is formed with a connecting channel and each adjoining member has a first end for inserting into the connecting channel, a second end disposed with multiple equally spaced tenons and an engaging face under the tenons. Each tenon has an arch bottom. The wall board has an upper end disposed with multiple dovetail mortises corresponding to the tenons of the adjoining member and has a supporting face on inner side of the dovetail mortises for engaging with the engaging face of the adjoining member. The horizontal board is associated with the wall board with the tenons inserted in the mortises and the engaging face supported by the supporting face so that the horizontal board is reinforced to bear heavier load. In a working site, the horizontal board and the wall board can be easily and quickly assembled into the cabinet.

1 Claim, 3 Drawing Sheets

CABINET WALL BOARD ASSEMBLY

BACKGROUND OF THE INVENTION

The present invention relates to a cabinet wall board assembly, and more particularly to a cabinet wall. board assembly which can be directly assembled according to the size of the board material and in which the load on the horizontal board is fully supported by the adjoining portions of the horizontal board and the wall board.

The existing assembled cabinet is composed of several wooden horizontal boards and wall boards which are directly formed with tenons and mortises. Such cabinet is assembled by means of engaging the tenons with the mortises without using any nail. However, during manufacturing, in case the board material has relatively large area, a large work bench will be necessary for the working. This causes difficulty and inconveniency in working and affects the production efficiency.

In addition, the tenons and mortises of the conventional assembled cabinet are designed with cooperative rectangular shape which is often deformed by humidity after a period of use. Under such circumstance, it often takes place that the tenons are stuck in the mortises when engaged therewith.

SUMMARY OF THE INVENTION

It is therefore a primary object of the present invention to provide a cabinet wall board assembly which can be directly assembled according to the size of the board material and in which the horizontal board is easily and quickly assembled with the wall board and the load on the horizontal board is firmly supported thereby.

It is a further object of the present invention to provide the above cabinet wall board assembly including several separate adjoining members, whereby the wall board assembly can be freely adjustably assembled according to the size of the board material and can be mass-produced to reduce the manufacturing cost.

It is still a further object of the present invention to provide the above cabinet wall board assembly in which the tenons of the adjoining members has arch bottoms so that when inserted into the mortises, the tenons are easily guided thereinto.

The present invention can be best understood through the following description and accompanying drawing, wherein:

DETAILED DESCRIPTION OF THE PREFERRED EMBODIMENT

Figure 1:
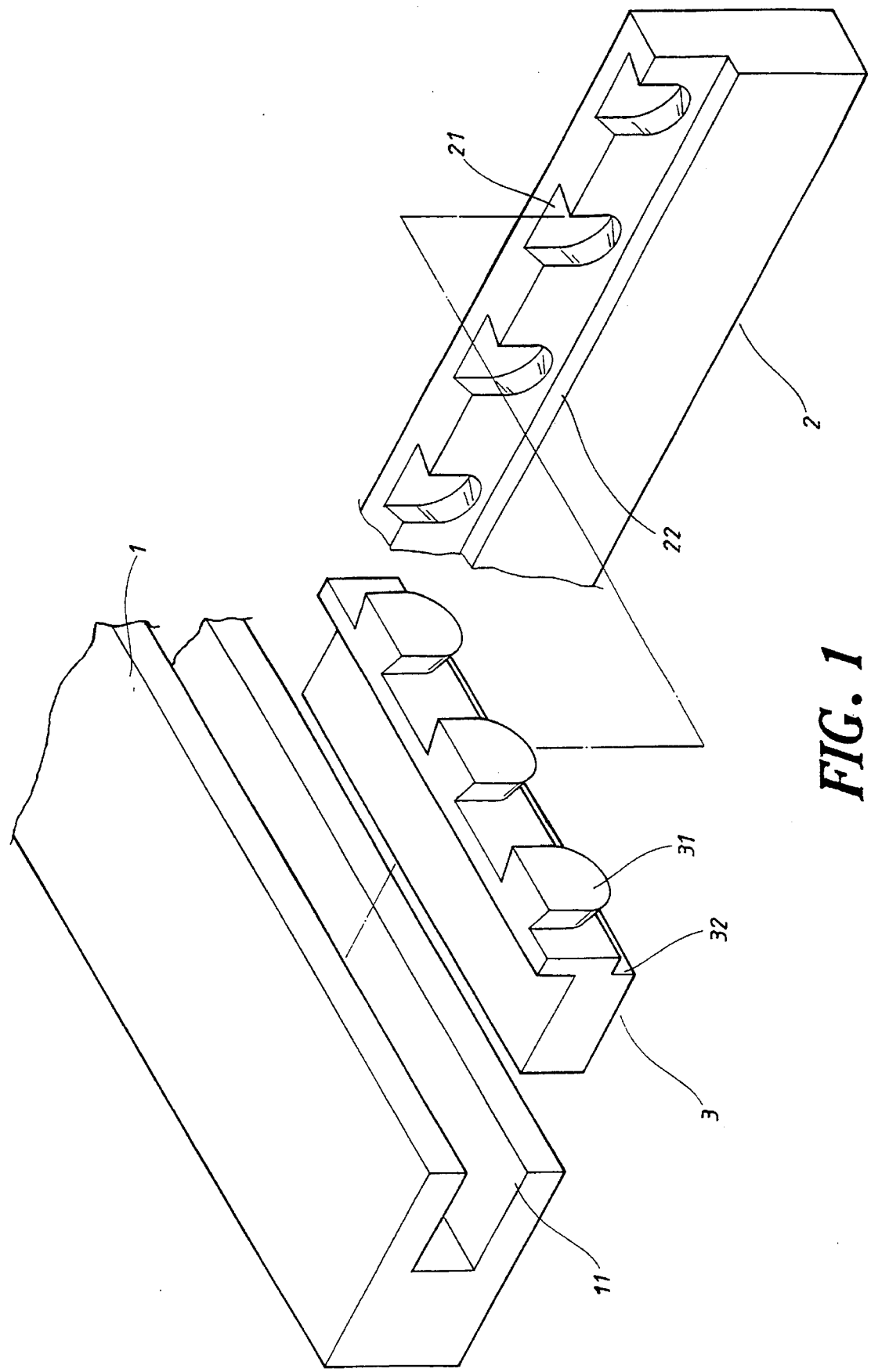
FIG. 1 is a perspective exploded view of the present invention.
Figure 3:
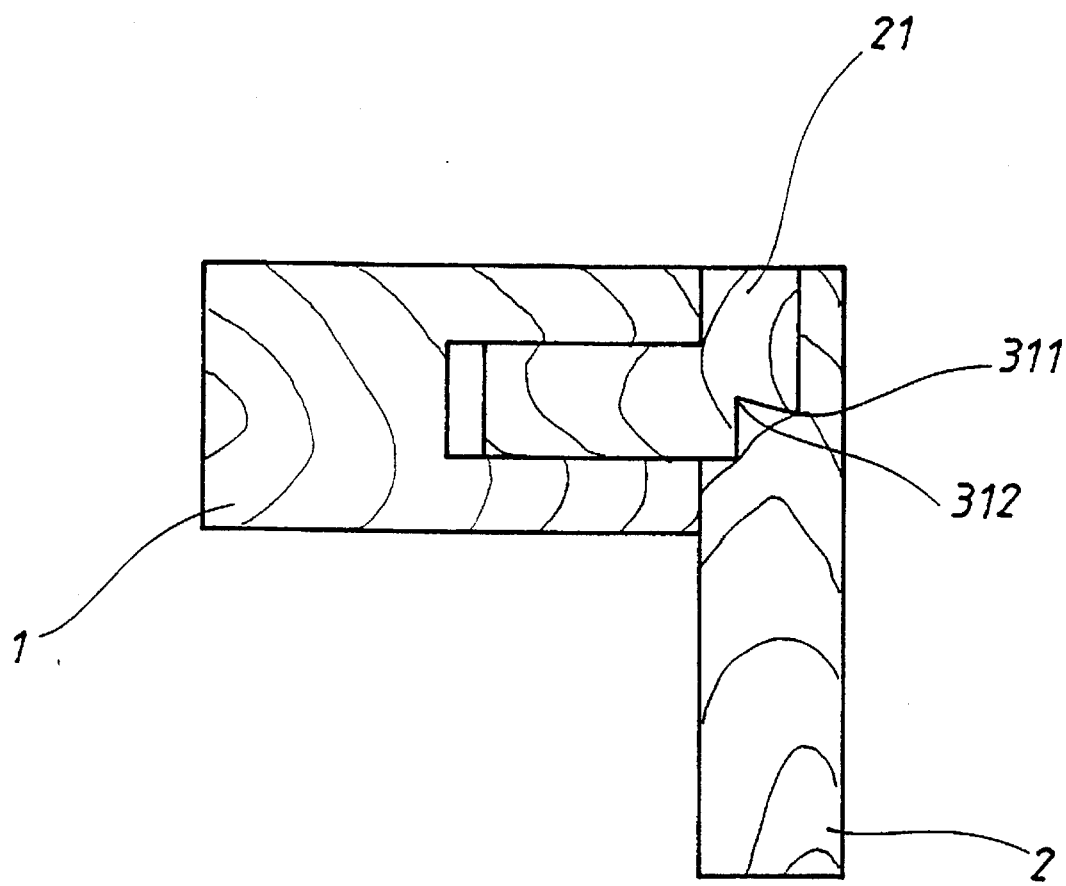
FIG. 3 is a side sectional view of the present invention.

Please refer to FIG. 1. The present invention includes a horizontal board 1, a wall board 2 and multiple adjoining members 3. The horizontal board 1 is formed with a connecting channel 11 and the adjoining member 3 has several equally spaced tenons 31 at front end. Each tenon 31 has an arch bottom, an end face 311 and a root portion 312. The tenon 31 is tapered from the end face 311 to the root portion 312 as shown in FIG. 3. The wall board 2 has multiple dovetail mortises 21 at upper end corresponding to the tenons 31 of the adjoining member 3. Each mortise 21 has an arch bottom as the arch bottom of the tenon 31. A supporting face 22 is formed on an inner side of the dovetail mortise 21 of the wall board 2.

Figure 2:
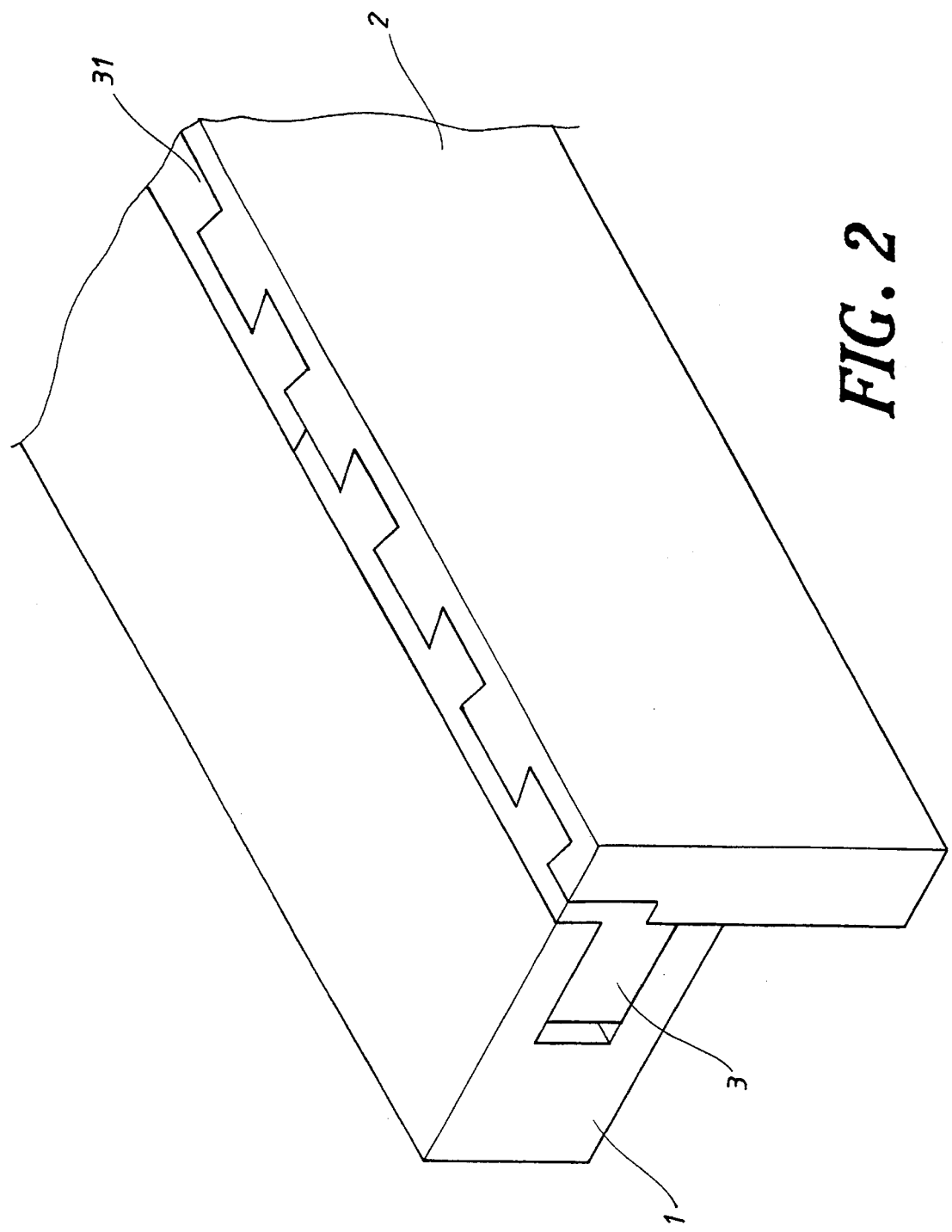
FIG. 2 is a perspective assembled view of the present invention.

Please refer to FIG. 2. The adjoining member 3 is fitted in the connecting channel 11 of the horizontal board 1. The number of the adjoining members 3 is determined by the size of the horizontal board 1. By means of the arch bottom of the tenon 31, when inserted into the mortise 21 of the wall board 2, the tenon 31 is guided into the mortise 21 without being stuck therein. In addition, the adjoining member 3 has an engaging face 32 for engaging with the supporting face 22 of the wall board 2 and the tenons 31 are snugly firmly fitted in the mortises 21, whereby the horizontal board 1 is able to fully bear both vertical and horizontal load.

Please refer to FIG. 3. When fitted with the horizontal board 1, the adjoining member 3 can be adjusted and slided forward or rearward within the connecting channel 11 according to actual requirement so as to tightly associate the horizontal board 1 with the wall board 2.

It is to be understood that the above description and drawings are only used for illustrating one embodiment of the present invention, not intended to limit the scope thereof. Any variation and derivation from the above description and drawings should be included in the scope of the present invention.

What is claimed is:

1. A cabinet wall board assembly comprising:

a horizontal board formed with a connecting channel;

multiple adjoining members each having a first end for inserting into the connecting channel and a second end disposed with multiple equally spaced tenons, each tenon having an arch bottom, an end face and a root portion, the tenon being tapered from the end face to the root portion, each said adjoining member further having an engaging face under the tenons; and a wall board having an upper end disposed with multiple dovetail mortises corresponding to the tenons of the adjoining members and having a supporting face on the inner side of the dovetail mortises for engaging with the engaging faces of the adjoining members.

\* \* \* \* \*